US009986266B2

(12) United States Patent
Zhou et al.

(10) Patent No.: US 9,986,266 B2
(45) Date of Patent: May 29, 2018

(54) METHOD, APPARATUS AND SYSTEM FOR PLAYING MULTIMEDIA FILE

(71) Applicant: Tencent Technology (Shenzhen) Company Limited, Shenzhen (CN)

(72) Inventors: Bin Zhou, Shenzhen (CN); Mingliang Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/678,512

(22) Filed: Aug. 16, 2017

(65) Prior Publication Data
US 2017/0353740 A1  Dec. 7, 2017

Related U.S. Application Data

(63) Continuation of application No. 15/191,332, filed on Jun. 23, 2016, now Pat. No. 9,769,502, which is a
(Continued)

(30) Foreign Application Priority Data

Jun. 25, 2014  (CN) .......................... 2014 1 0291224

(51) Int. Cl.
*H04N 21/00* (2011.01)
*G11B 27/00* (2006.01)
(Continued)

(52) U.S. Cl.
CPC ............. *H04N 21/00* (2013.01); *G11B 27/00* (2013.01); *H04M 1/72547* (2013.01); *H04W 88/02* (2013.01)

(58) Field of Classification Search
CPC ... G11B 27/00; H04M 1/72547; H04N 21/00; H04W 88/02; G10L 19/005; G10L 25/12;
(Continued)

(56) References Cited

U.S. PATENT DOCUMENTS 9,769,502 B2 * 9/2017 Zhou ...................... H04N 21/00
2003/0110057 A1   6/2003 Pisz
(Continued)

FOREIGN PATENT DOCUMENTS

CN   202004847 U   10/2011
CN   102256007 A   11/2011
CN   103513769 A    1/2014

OTHER PUBLICATIONS

Tencent Technology, ISRWO, PCT/CN2015/082085, dated Sep. 25, 2014, 6 pgs.
(Continued)

*Primary Examiner* — Kashif Siddiqui
(74) *Attorney, Agent, or Firm* — Morgan, Lewis & Bockius LLP

(57) ABSTRACT

At a mobile terminal coupled to a control apparatus using an interface provided by the mobile terminal: receiving a user instruction to play a main multimedia file; playing a pre-arranged multimedia file associated with the main multimedia file before playing all or a portion of the main multimedia file; while playing the pre-arranged multimedia file, receiving an operation signal from the control apparatus through the interface, wherein the control signal is sent to the mobile terminal in response to a user operation received at the control apparatus, and the control signal corresponds to a control instruction regarding playback of the pre-arranged multimedia file; in response to receiving the control signal: if a user account associated with the mobile terminal meets authorization criteria with respect to the control instruction, executing, according to the control
(Continued)

instruction, a control operation on the pre-arranged multimedia file that is being played.

18 Claims, 8 Drawing Sheets

Related U.S. Application Data continuation of application No. PCT/CN2015/082085, filed on Jun. 23, 2015.

(51) Int. Cl.
  *H04M 1/725* (2006.01)
  *H04W 88/02* (2009.01)

(58) Field of Classification Search
  CPC .. H04R 2225/43; H04R 25/305; H04R 25/43; H04R 25/554
  See application file for complete search history.

(56) References Cited

U.S. PATENT DOCUMENTS

| | | | |
|---|---|---|---|
| 2008/0096174 A1* | 4/2008 | Bodlaender | G09B 5/06 434/308 |
| 2010/0198982 A1 | 8/2010 | Fernandez | |
| 2012/0250861 A1 | 10/2012 | Ishii et al. | |
| 2014/0313358 A1 | 10/2014 | Yu | |
| 2015/0188907 A1 | 7/2015 | Khalid et al. | |
| 2015/0304757 A1* | 10/2015 | Kim | H04R 1/1041 381/74 |

OTHER PUBLICATIONS

Tencent Technology, IPRP, PCT/CN2015/082085, dated Dec. 27, 2016, 4 pgs.

* cited by examiner

METHOD, APPARATUS AND SYSTEM FOR PLAYING MULTIMEDIA FILE

PRIORITY CLAIMS AND RELATED APPLICATIONS

This application is a continuation application of U.S. patent application Ser. No. 15/191,332, filed Jun. 23, 2016, entitled "METHOD, APPARATUS, AND SYSTEM FOR PLAYING MULTIMEDIA FILE," which is a continuation application of PCT Patent Application No. PCT/CN2015/082085, entitled "METHOD, APPARATUS, AND SYSTEM FOR PLAYING MULTIMEDIA FILE," filed on Jun. 23, 2015, which claims priority to Chinese Patent Application No. 201410291224.2, "METHOD, APPARATUS, AND SYSTEM FOR PLAYING MULTIMEDIA FILE," filed on Jun. 25, 2014, all of which are hereby incorporated by reference in their entirety.

FIELD OF THE TECHNOLOGY

The present disclosure relates to the field of computer technologies, and in particular, to a method, an apparatus, and a system for playing a multimedia file.

BACKGROUND OF THE DISCLOSURE

In recent years, various video websites gain ever-increasing popularity. People can select videos that they prefer from the video websites, and play the selected videos by using a player in a mobile terminal.

Advertisements are usually inserted before the videos are played in the video websites; therefore, an existing method for playing a multimedia file includes: acquiring, by a mobile terminal, an advertisement list and a video, successively playing advertisements in the advertisement list according to an advertisement playback policy, and playing the video after the advertisements in the advertisement list are played.

If it is required to skip the advertisements, a user needs to operate the mobile terminal, which wears down devices of the mobile terminal and shortens the service life of the mobile terminal.

SUMMARY

According to a first aspect, an embodiment of the present invention provides a method for playing a multimedia file, which is used in a control apparatus; the control apparatus being connected to a mobile terminal by using an interface provided by the mobile terminal, and the method including:

establishing a connection to the mobile terminal using the interface;

receiving, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal; and sending an operation signal corresponding to the operation to the mobile terminal by means of the connection, so that the mobile terminal generates a control instruction according to the operation signal, and executes, according to the control instruction, a control operation on the pre-arranged multimedia file that is being played.

According to a second aspect, an embodiment of the present invention provides a method for playing a multimedia file, which is used in a mobile terminal providing an interface; a control apparatus being connected to the mobile terminal using the interface, and the method including:

receiving, during playback of a pre-arranged multimedia file, an operation signal sent by the control apparatus, the operation signal being a signal that is sent by the control apparatus after the control apparatus receives an operation triggered on the control apparatus and is corresponding to the operation, the pre-arranged multimedia file being a file played before a main multimedia file, and the main multimedia file being a multimedia file that is selected to be played with the mobile terminal;

generating a control instruction according to the operation signal; and executing, according to the control instruction, a control operation on the pre-arranged multimedia file that is being played.

According to a third aspect, an embodiment of the present invention provides an apparatus for playing a multimedia file, which is used in a control apparatus; the control apparatus being connected to a mobile terminal by using an interface provided by the mobile terminal, and the apparatus including:

a connection establishment module, configured to establish a connection to the mobile terminal using the interface;

a first receiving module, configured to receive, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal; and a first sending module, configured to send, to the mobile terminal by means of the connection, an operation signal corresponding to the operation received by the first receiving module, so that the mobile terminal generates a control instruction according to the operation signal, and executes, according to the control instruction, a control operation on the pre-arranged multimedia file that is being played.

According to a fourth aspect, an embodiment of the present invention provides an apparatus for playing a multimedia file, which is used in a mobile terminal providing an interface; a control apparatus being connected to the mobile terminal using the interface, and the apparatus including:

a first receiving module, configured to receive, during playback of a pre-arranged multimedia file, an operation signal sent by the control apparatus, the operation signal being a signal that is sent by the control apparatus after the control apparatus receives an operation triggered on the control apparatus and is corresponding to the operation, the pre-arranged multimedia file being a file played before a main multimedia file, and the main multimedia file being a multimedia file that is selected to be played with the mobile terminal;

a first generation module, configured to generate a control instruction according to the operation signal received by the first receiving module; and an operation execution module, configured to execute, according to the control instruction generated by the first generation module, a control operation on the pre-arranged multimedia file that is being played.

According to a fifth aspect, an embodiment of the present invention provides a system for playing a multimedia file, the system including: a control apparatus and a mobile terminal;

the control apparatus including the apparatus for playing a multimedia file according to the third aspect; and the mobile terminal including the apparatus for playing a multimedia file according to the fourth aspect.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

To make the objectives, technical solutions, and advantages of the present disclosure clearer, the embodiments of the present invention are described in detail below with reference to the accompanying drawings.

Figure 1:
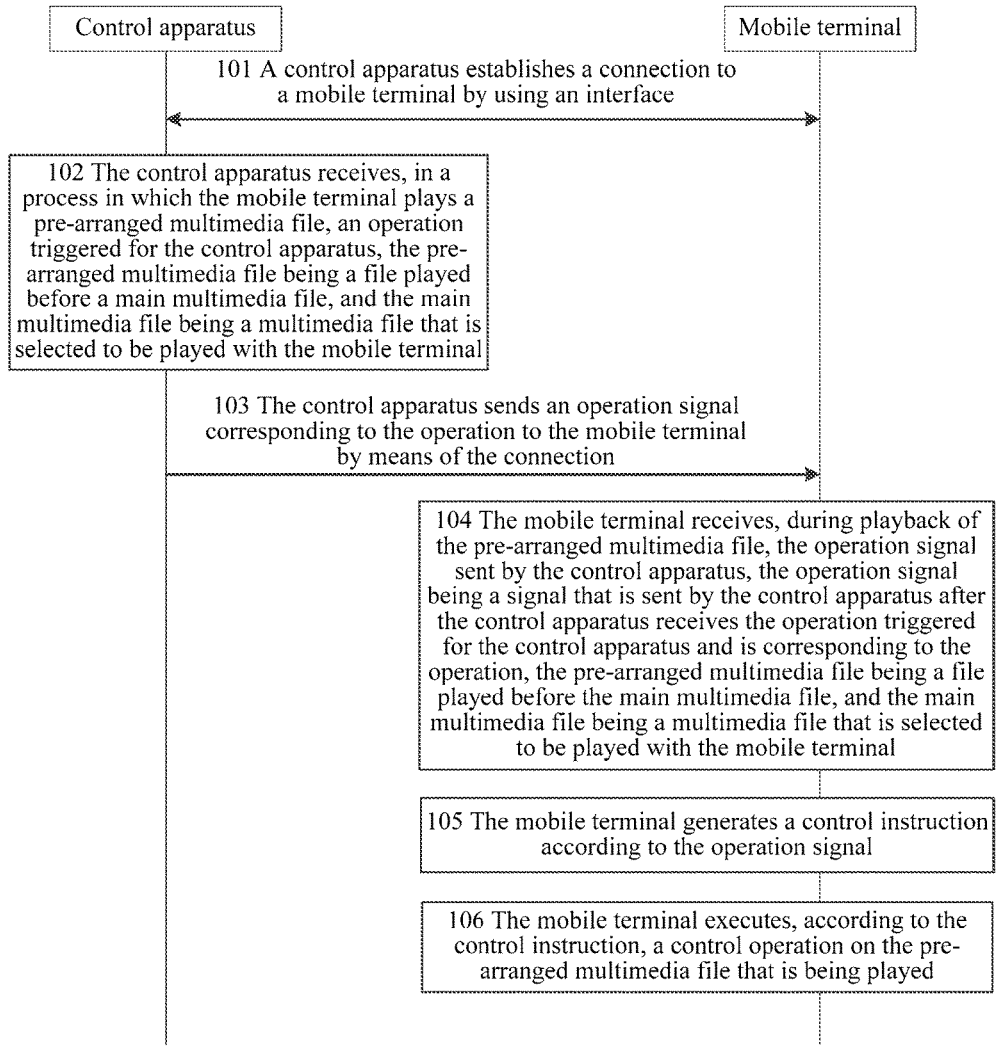
FIG. 1 is a method flowchart of a method for playing a multimedia file according to an embodiment of the present invention.

Referring to FIG. 1, FIG. 1 is a method flowchart of a method for playing a multimedia file according to an embodiment of the present invention. The method for playing a multimedia file can be applied to a playback system including a control apparatus and a mobile terminal, where the control apparatus is connected to the mobile terminal by using an interface provided by the mobile terminal, and the mobile terminal may be a smart TV, a smartphone, a tablet computer, or the like. The method for playing a multimedia file includes:

Step 101. A control apparatus establishes a connection to a mobile terminal by using an interface.

The control apparatus is an apparatus for controlling a process in which the mobile terminal plays the multimedia file, and the control apparatus may be implemented as a control device. The multimedia file may be one of a video, an audio, and a picture.

The control apparatus is connected to the mobile terminal using the interface provided by the mobile terminal. The control apparatus may be inserted into the mobile terminal using the interface provided by the mobile terminal, or may also be connected to one end of a transit device or a connection line; and the other end of the transit device or the connection line is inserted into the mobile terminal using the interface provided by the mobile terminal.

Step 102. The control apparatus receives, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal.

The main multimedia file is a multimedia file that is selected by a user to be played with the mobile terminal, for example, a video that is selected by the user at a video website when the user browses the video website with the mobile terminal. The pre-arranged multimedia file is a multimedia file played before the main multimedia file, for example, an advertisement played before the video selected by the user. There may be at least one pre-arranged multimedia file, and the mobile terminal plays the main multimedia file after completing playback of the at least one pre-arranged multimedia file.

It should be noted that, for some popular main multimedia files, after the main multimedia file is played for a certain duration, the main multimedia file is paused and the pre-arranged multimedia file is inserted; and the main multimedia file is continued to be played after playback of the pre-arranged multimedia file is completed. In this case, the pre-arranged multimedia file is a multimedia file played during playback of the main multimedia file. This embodiment does not limit the time at which the pre-arranged multimedia file is played.

Step 103. The control apparatus sends an operation signal corresponding to the operation to the mobile terminal by means of the connection.

Step 104. The mobile terminal receives, during playback of the pre-arranged multimedia file, the operation signal sent by the control apparatus, the operation signal being a signal that is sent by the control apparatus after the control apparatus receives the operation triggered on the control apparatus and is corresponding to the operation, the pre-arranged multimedia file being a file played before the main multimedia file, and the main multimedia file being a multimedia file that is selected to be played with the mobile terminal.

Step 105. The mobile terminal generates a control instruction according to the operation signal.

In this embodiment, different operation signals correspond to different control instructions; and therefore, the mobile terminal may identify an operation signal after receiving the operation signal, and generate a control instruction corresponding to the operation signal.

Step 106. The mobile terminal executes, according to the control instruction, a control operation on the pre-arranged multimedia file that is being played.

The mobile terminal controls playback of the pre-arranged multimedia file according to the generated control instruction. For example, the mobile terminal may pause the pre-arranged multimedia file, or may also fast-forward the pre-arranged multimedia file.

The process in which the mobile terminal plays the pre-arranged multimedia file can be controlled by executing an operation on the control apparatus, without the need of operating the mobile terminal, thereby avoiding wearing down devices in the mobile terminal, and achieving an effect of prolonging the service life of the mobile terminal.

It should be noted that, steps 101 to 103 may be integrally implemented as a method for playing a multimedia file at the side of the control apparatus, and steps 104 to 106 may be integrally implemented as a method for playing a multimedia file at the side of the mobile terminal.

To sum up, in the method for playing a multimedia file according to this embodiment of the present invention, a connection is established to a mobile terminal by using an interface; in a process in which the mobile terminal plays a pre-arranged multimedia file, an operation triggered for a control apparatus is received, the pre-arranged multimedia file being a file played before a main multimedia file, and the main multimedia file being a multimedia file that is selected to be played with the mobile terminal; and an operation signal corresponding to the operation is sent to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

Figure 2A:
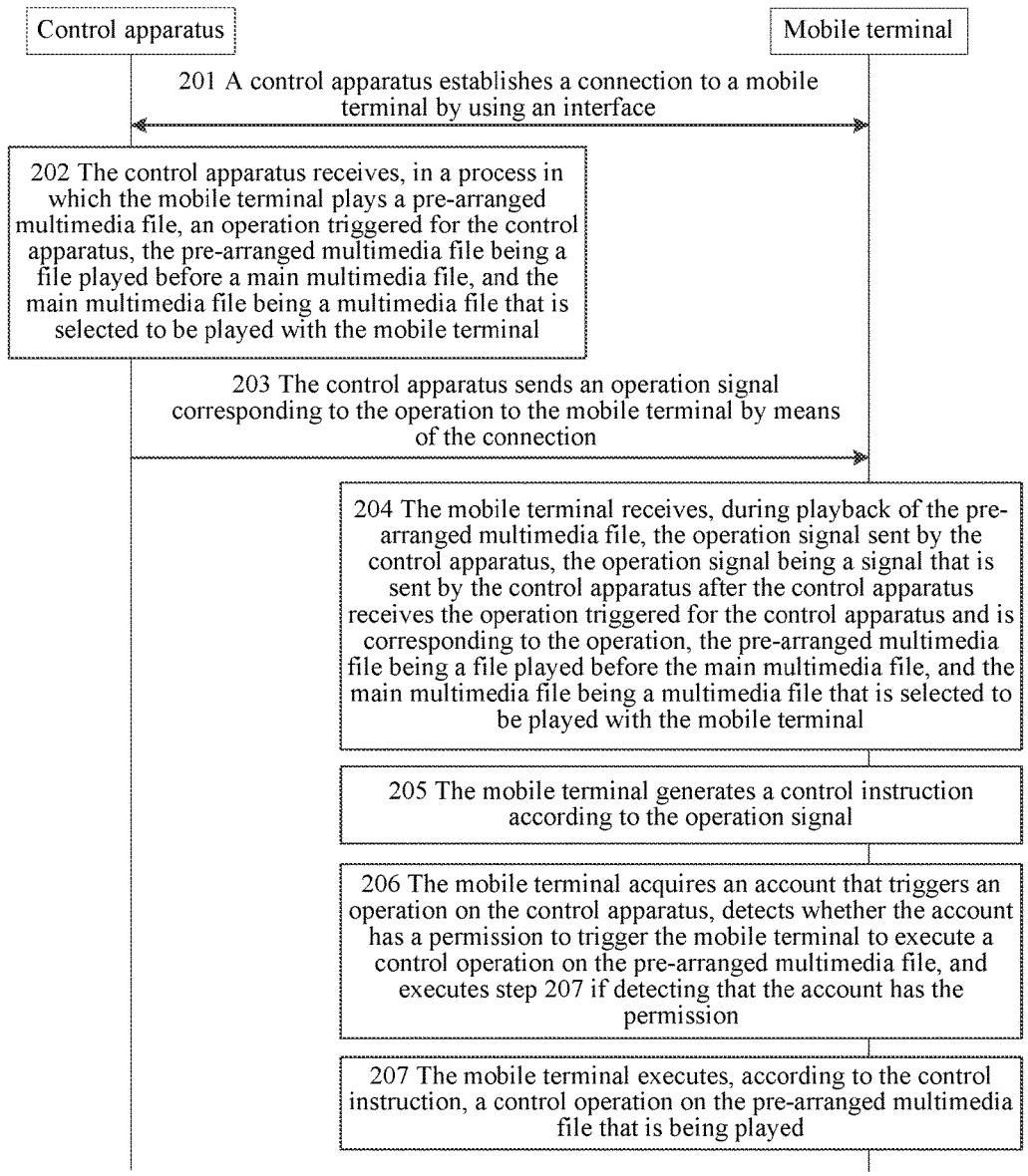
FIG. 2A is a method flowchart of a method for playing a multimedia file according to another embodiment of the present invention.

Referring to FIG. 2A, FIG. 2A is a method flowchart of a method for playing a multimedia file according to another embodiment of the present invention. The method for playing a multimedia file can be applied to a playback system including a control apparatus and a mobile terminal, where the control apparatus is connected to the mobile terminal by using an interface provided by the mobile terminal, and the mobile terminal may be a smart TV, a smartphone, a tablet computer, or the like. This embodiment is described by using an example in which a user does not log in to an account with the mobile terminal when a pre-arranged multimedia file is played. The method for playing a multimedia file includes:

Step 201. A control apparatus establishes a connection to a mobile terminal by using an interface.

The control apparatus is an apparatus for controlling a process in which the mobile terminal plays the multimedia file, and the control apparatus may be implemented as a control device. The multimedia file may be one of a video, an audio, and a picture.

The control apparatus is connected to the mobile terminal using the interface provided by the mobile terminal. The control apparatus may be inserted into the mobile terminal using the interface provided by the mobile terminal, or may also be connected to one end of a transit device or a connection line; and the other end of the transit device or the connection line is inserted into the mobile terminal using the interface provided by the mobile terminal.

In this embodiment, the interface provided by the mobile terminal is an earphone interface, a Universal Serial Bus (USB) interface, a micro USB interface, a mini USB interface, or a lighting interface. Certainly, the interface provided by the mobile terminal may also be another interface that is not mentioned in this embodiment, and this embodiment does not limit the interface.

Figure 2B:
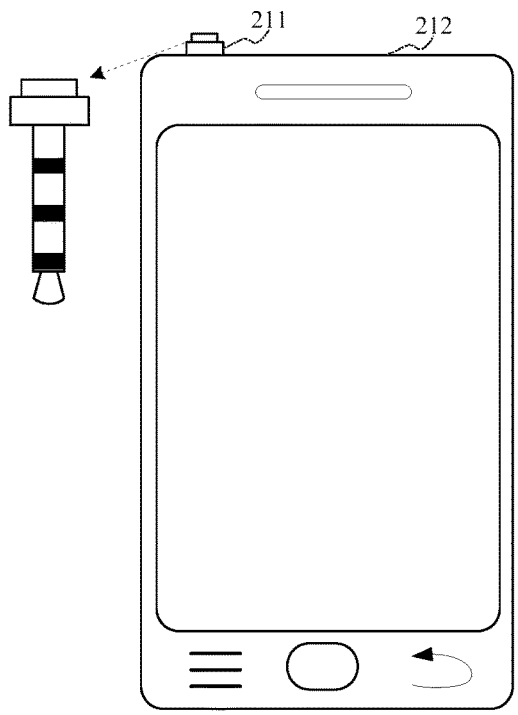
FIG. 2B is a schematic diagram showing a connection between a control apparatus and a mobile terminal according to an embodiment of the present invention.

When the interface is the earphone interface, refer to FIG. 2B, which is a schematic diagram showing a connection between a control apparatus and a mobile terminal. In FIG. 2B, the control apparatus 211 is inserted into the mobile terminal 212 by using an earphone interface, and refer to a schematic structural diagram of the control apparatus 211 at the left side of FIG. 2B. The control apparatus 211 is provided with an operation button at the top, and the operation button is used to operate the control apparatus 211.

Step 202. The control apparatus receives, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal.

The main multimedia file is a multimedia file that is selected by a user to be played with the mobile terminal, for example, a video that is selected by the user at a video website when the user browses the video website with the mobile terminal. The pre-arranged multimedia file is a multimedia file played before the main multimedia file, for example, an advertisement played before the video selected by the user. There may be at least one pre-arranged multimedia file, and the mobile terminal plays the main multimedia file after completing playback of the at least one pre-arranged multimedia file.

It should be noted that, for some popular main multimedia files, after the main multimedia file is played for a certain duration, the main multimedia file is paused and the pre-arranged multimedia file is inserted; and the main multimedia file is continued to be played after playback of the pre-arranged multimedia file is completed. In this case, the pre-arranged multimedia file is a multimedia file played during playback of the main multimedia file. This embodiment does not limit the time at which the pre-arranged multimedia file is played.

In the process in which the mobile terminal plays the pre-arranged multimedia file, if the user is not interested in the pre-arranged multimedia file that is being played, the user may operate the control apparatus, so as to control the playback of the pre-arranged multimedia file by means of the operation.

The receiving an operation triggered on the control apparatus includes:

receiving a button pressing operation triggered on the control apparatus, or receiving a touch operation triggered on the control apparatus.

If a button is disposed on the top of the control apparatus, the user may press the button in the process in which the mobile terminal plays the pre-arranged multimedia file, to trigger the button pressing operation on the control apparatus; if a touch sensor is disposed on the top of the control apparatus, the user may touch the touch sensor in the process in which the mobile terminal plays the pre-arranged multimedia file, to trigger the touch operation on the control apparatus.

Step 203. The control apparatus sends an operation signal corresponding to the operation to the mobile terminal by means of the connection.

In this embodiment, if different operations are triggered on the control apparatus, different operation signals are generated. Therefore, the control apparatus may acquire an operation triggered by the user, to obtain an operation signal corresponding to the operation, and then send the operation signal to the mobile terminal by means of the connection established to the mobile terminal.

Specifically, the sending an operation signal corresponding to the operation to the mobile terminal by means of the connection includes:

1) generating a corresponding operation signal according to the number of times a button is pressed during the button pressing operation and a button pressing duration of the button pressing operation, where the operation signal is used to instruct the mobile terminal to generate a first playback instruction for playing a next pre-arranged multimedia file, or the operation signal is used to instruct the mobile terminal to generate a second playback instruction for playing the main multimedia file, or the operation signal is used to instruct the mobile terminal to generate a fast-forwarding instruction for fast-forwarding the pre-arranged multimedia file for a designated duration; and 2) sending the operation signal to the mobile terminal by means of the connection.

If a button pressing operation is triggered on the control apparatus, the control apparatus may acquire the number of times the user presses the button and the button pressing duration, and the corresponding operation signal is generated according to the number of times the button is pressed and the button pressing duration. For example, if the user presses the button only once and the button pressing duration is less than a preset threshold, a single-click signal is generated; if the user continuously presses the button twice, a double-click signal is generated; or if the user presses the button once and the button pressing duration is greater than the preset threshold, a long-press signal is generated. If a touch operation is triggered on the control apparatus, the control apparatus may acquire the number of times the user touches the control apparatus, a touch gesture, and a touch duration, and generate the foregoing operation signal according to the number of times the user touches the control apparatus, the touch gesture, and the touch duration.

In this embodiment, the operation signal is used to instruct the mobile terminal to generate a control instruction, and the control instruction may include a first playback instruction, a second playback instruction, and a fast-forwarding instruction. Therefore, different operation signals may be made to correspond to the three control instructions respectively. For example, the single-click signal is made to correspond to the first playback instruction, the double-click signal is made to correspond to the second playback instruction, and the long-press signal is made to correspond to the fast-forwarding instruction. Certainly, another correspondence may also be set between the operation signal and the control instruction, which is not limited in this embodiment.

The first playback instruction is used to instruct the mobile terminal to skip the pre-arranged multimedia file that is being played currently and play a next pre-arranged multimedia file. The second playback instruction is used to instruct the mobile terminal to skip all pre-arranged multimedia files and play the main multimedia file. The fast-forwarding instruction is used to instruct the mobile terminal to fast-forward, for a designated duration, the pre-arranged multimedia file that is being played currently.

Step 204. The mobile terminal receives, during playback of the pre-arranged multimedia file, the operation signal sent by the control apparatus, the operation signal being a signal that is sent by the control apparatus after the control apparatus receives the operation triggered on the control apparatus and is corresponding to the operation, the pre-arranged multimedia file being a file played before the main multimedia file, and the main multimedia file being a multimedia file that is selected to be played with the mobile terminal.

The mobile terminal receives, by means of the connection established to the control apparatus, the operation signal sent by the control apparatus.

Step 205. The mobile terminal generates a control instruction according to the operation signal.

In this embodiment, different operation signals correspond to different control instructions; and therefore, the mobile terminal may identify an operation signal after receiving the operation signal, and generate a control instruction corresponding to the operation signal.

Description is made by still using the correspondence that is described in step 203 and between the operation signal and the control instruction as an example. If the mobile terminal identifies that the operation signal is the single-click signal, the mobile terminal generates the first playback instruction; if the mobile terminal identifies that the operation signal is the double-click signal, the mobile terminal generates the second playback instruction; or if the mobile terminal identifies that the operation signal is the long-press signal, the mobile terminal generates the fast-forwarding instruction.

Step 206. The mobile terminal acquires an account that triggers an operation on the control apparatus, detects whether the account has a permission to trigger the mobile terminal to execute a control operation on the pre-arranged multimedia file, and executes step 207 if detecting that the account has the permission.

Because playing the pre-arranged multimedia file aims at advertising content of the pre-arranged multimedia file, in order to ensure an advertising effect of the pre-arranged multimedia file, a permission may be set for an account of a user who triggers the control instruction, where the permission is used to indicate whether the account can trigger the mobile terminal to execute the control operation on the pre-arranged multimedia file. The permission may be set for the account according to a preset policy. For example, when a certain account is a member of a video website, it may be set that the account has the permission; or when a certain account makes a lot of contributions to a video website, it may be set that the account has the permission.

After generating the control instruction, the mobile terminal needs to acquire the account of the user. Because the user does not log in to the account with the mobile terminal, the mobile terminal may display in a playback interface a text box for the user to enter the account and a password, and acquire the account by acquiring content entered by the user into the text box.

After acquiring the account, the mobile terminal may detect whether the account belongs to a preset account list, determine that the account has the permission if the account belongs to the account list, or determine that the account does not have the permission if the account does not belong to the account list. The account list is used to record accounts having the permission.

If a certain account has the permission to trigger the mobile terminal to execute a control operation on the pre-arranged multimedia file, the mobile terminal may respond to the control instruction, that is, execute step 207; if a certain account does not have the permission to trigger the mobile terminal to execute a control operation on the pre-arranged multimedia file, the mobile terminal does not respond to the control instruction, and continues to play the pre-arranged multimedia file, so as to ensure an advertising effect of the pre-arranged multimedia file.

Optionally, after the detecting whether the account has a permission to trigger the mobile terminal to execute a control operation on the pre-arranged multimedia file, the method further includes:

displaying prompt information if it is detected that the account has the permission, where the prompt information is used to prompt for an operation manner for the control apparatus.

If the mobile terminal detects that the account has the permission, the mobile terminal may further display the prompt information in the playback interface, where the prompt information is used to prompt the user about the operation manner for the control apparatus. After being prompted by the prompt information, the user may clearly know how to trigger the control apparatus so that the mobile terminal generates the control instruction, thereby reducing the difficulty in triggering the control instruction, and increasing the number of times the control instruction is triggered, so as to achieve an effect of prolonging the service life of the mobile terminal.

For example, the prompt information may be as follows: You are our honored member! To skip this advertisement, please press the button of the control apparatus once; to skip all advertisements, please press the button of the control apparatus twice; and to fast-forward this advertisement, please press the button of the control apparatus for a long time.

Optionally, the mobile terminal may also set a font, a color, or a background color for the prompt information, so as to enhance a prompt effect.

Step 207. The mobile terminal executes, according to the control instruction, a control operation on the pre-arranged multimedia file that is being played.

The mobile terminal controls playback of the pre-arranged multimedia file according to the generated control instruction. For example, the mobile terminal may pause the pre-arranged multimedia file, or may also fast-forward the pre-arranged multimedia file. The process in which the mobile terminal plays the pre-arranged multimedia file can be controlled by executing an operation on the control apparatus, without the need of operating the mobile terminal, thereby avoiding wearing down devices in the mobile terminal, and achieving an effect of prolonging the service life of the mobile terminal.

If the mobile terminal fast-forwards the pre-arranged multimedia file, a processing resource of the mobile terminal that is occupied during playback of the pre-arranged multimedia file is reduced, and a processing capability of the mobile terminal is improved; and moreover, a time spent by a user in waiting for playback of the main multimedia file is shortened, and user experience is improved.

Specifically, the executing, according to the control instruction, a control operation on the pre-arranged multimedia file that is being played includes:

1) if the control instruction is a first playback instruction for instructing the mobile terminal to play a next pre-arranged multimedia file, reading a to-be-played pre-arranged multimedia file and playing the pre-arranged multimedia file;

2) if the control instruction is a second playback instruction for instructing the mobile terminal to play a main multimedia file, reading the main multimedia file and playing the main multimedia file; and 3) if the control instruction is a fast-forwarding instruction for instructing the mobile terminal to fast-forward the pre-arranged multimedia file for a designated duration, acquiring a current playback duration for which the pre-arranged multimedia file is played, locating forward, based on the current playback duration, a playback time point at which the designated duration ends, and starting playing the pre-arranged multimedia file from the located playback time point.

First, when the control instruction is the first playback instruction, the mobile terminal may read a to-be-played pre-arranged multimedia file that is arranged just behind the pre-arranged multimedia file, and play the pre-arranged multimedia file. The mobile terminal may preset a pre-arranged multimedia file library, and read the pre-arranged multimedia file from the pre-arranged multimedia file library.

For example, there are four pre-arranged multimedia files corresponding to the main multimedia file in the pre-arranged multimedia file library. If receiving the first playback instruction during playback of the second pre-arranged multimedia file, the mobile terminal reads the third pre-arranged multimedia file from the pre-arranged multimedia file library and plays the third pre-arranged multimedia file.

Secondly, when the control instruction is the second playback instruction, the mobile terminal may read the main multimedia file, and play the main multimedia file.

For example, there are four pre-arranged multimedia files corresponding to the main multimedia file in the pre-arranged multimedia file library. If receiving the second playback instruction during playback of the second pre-arranged multimedia file, the mobile terminal reads the main multimedia file and plays the main multimedia file.

Thirdly, when the control instruction is the fast-forwarding instruction, the mobile terminal may acquire the current playback duration for which the pre-arranged multimedia file that is being played currently is played, locate a playback time point according to the current playback duration and the designated duration, and start playing the pre-arranged multimedia file from the located playback time point.

For example, the mobile terminal receives the fast-forwarding instruction during playback of the second pre-arranged multimedia file, and if the current playback duration is 2 seconds and the designated duration indicated by the fast-forwarding instruction is 10 seconds, the playback time point located by the mobile terminal is the twelfth second; and then the mobile terminal starts playing the second pre-arranged multimedia file from the twelfth second.

Further, before the locating forward, based on the current playback duration, a playback time point at which the designated duration ends, the method further includes:

1) calculating a residual playback duration of the pre-arranged multimedia file;

2) comparing the residual playback duration with the designated duration;

3) if it is obtained after the comparison that the residual playback duration is shorter than the designated duration, reading a to-be-played pre-arranged multimedia file, and playing the pre-arranged multimedia file; or if it is obtained after the comparison that the residual playback duration is shorter than the designated duration, reading the main multimedia file, and playing the main multimedia file; or 4) if it is obtained after the comparison that the residual playback duration is longer than or equal to the designated duration, triggering execution of the step of locating forward, based on the current playback duration, a playback time point at which the designated duration ends.

Before the playback time point is located according to the current playback duration and the designated duration, it is further required to compare whether the residual playback duration of the pre-arranged multimedia file is longer than or shorter than the designated duration. If it is obtained after the comparison that the residual playback duration is shorter than the designated duration, a fault occurs when the playback time point at which the designated duration ends is located forward based on the current playback duration; and the mobile terminal may directly read a next pre-arranged multimedia file or the main multimedia file, and play the pre-arranged multimedia file or main multimedia file. If it is obtained after the comparison that the residual playback duration is longer than or equal to the designated duration, the playback time point may be located, and the details are described above.

For example, the mobile terminal receives the fast-forwarding instruction during playback of the second pre-arranged multimedia file; if the current playback duration is 8 seconds and the designated duration indicated by the fast-forwarding instruction is 10 seconds, assuming that the total playback duration of the second pre-arranged multimedia file is 15 seconds, it is obtained after calculation that the residual playback duration is 7 seconds; because the residual playback duration is shorter than the designated duration, the mobile terminal may read the third pre-arranged multimedia file and play the third pre-arranged multimedia file.

It should be noted that, the method for playing a multimedia file in this embodiment further includes:

1) receiving, in the process in which the mobile terminal plays the pre-arranged multimedia file, another operation triggered on the control apparatus; and 2) sending another operation signal corresponding to the other operation to the mobile terminal by means of the connection, so that the mobile terminal generates a display instruction according to the other operation signal, and displays information about a to-be-played pre-arranged multimedia file according to the display instruction.

The user may also trigger another operation on the control apparatus in the process in which the mobile terminal plays the pre-arranged multimedia file; and the control apparatus receives the other operation, and sends another operation signal corresponding to the other operation to the mobile terminal by means of the established connection. The other operation is an operation different from the control operation, for example, pressing the button three times by the user.

In this embodiment, the other operation signal corresponds to a display instruction, and the display instruction is used to instruct the mobile terminal to display information about the to-be-played pre-arranged multimedia file. The information about the to-be-played pre-arranged multimedia file includes at least one of the number of the to-be-played pre-arranged multimedia files and a total playback duration of the to-be-played pre-arranged multimedia files. For example, there are four pre-arranged multimedia files corresponding to the main multimedia file in the pre-arranged multimedia file library; if the mobile terminal is currently playing the second pre-arranged multimedia file and the pre-arranged multimedia file is an advertisement, the information may be that: two advertisements remain to be played.

Correspondingly, the method for playing a multimedia file in this embodiment further includes:

1) receiving, during playback of the pre-arranged multimedia file, another operation signal sent by the control apparatus, where the other operation signal is a signal that is sent by the control apparatus after the control apparatus receives another operation triggered on the control apparatus and is corresponding to the other operation;

2) generating a display instruction according to the other operation signal; and 3) displaying information about a to-be-played pre-arranged multimedia file according to the display instruction.

The mobile terminal receives another operation signal sent by the control apparatus, generates the display instruction corresponding to the other operation signal, and displays the information about the to-be-played pre-arranged multimedia file.

Optionally, the mobile terminal may further set a permission to respond to the display instruction. For example, the terminal may detect whether the account has the permission to trigger the mobile terminal to respond to the display instruction, and if the mobile terminal detects that the account has the permission, the mobile terminal displays the information in the playback interface.

Optionally, the mobile terminal may also set a font, a color, or a background color for the information, so as to enhance a prompt effect.

Figure 2C:
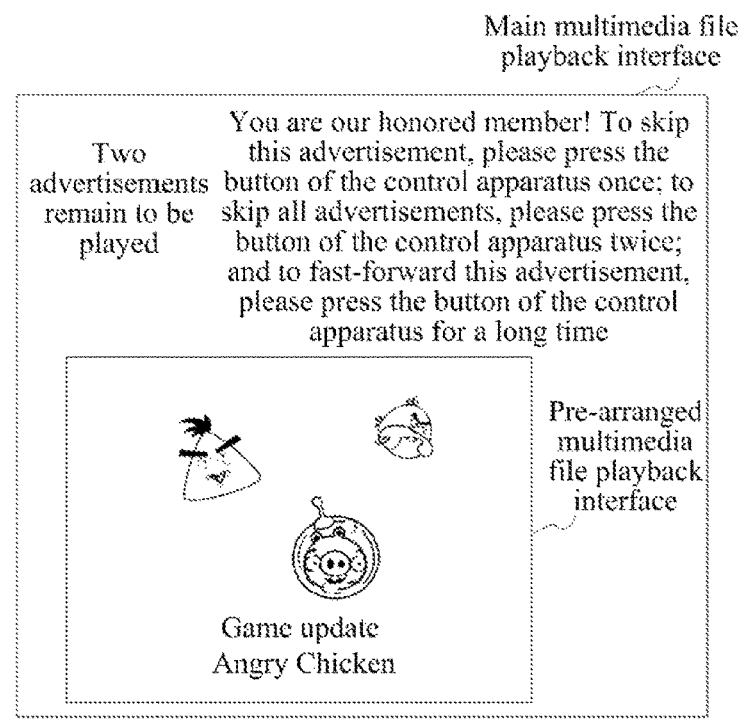
FIG. 2C is a schematic application diagram of a method for playing a multimedia file according to an embodiment of the present invention.

For ease of understanding, refer to FIG. 2C, which is a schematic application diagram of a method for playing a multimedia file. In FIG. 2C, the aforementioned prompt information and information about the to-be-played pre-arranged multimedia file are displayed in a pre-arranged multimedia file playback interface. The pre-arranged multimedia file playback interface may be the same as or different from a main multimedia file playback interface.

It should be noted that, after the mobile terminal executes step 207, the control apparatus may further continue to receive a triggered operation. That is, steps 201 to 207 are executed circularly in a process in which the mobile terminal plays the pre-arranged multimedia file, till the mobile terminal completes playback of all pre-arranged multimedia files and ends the process. Optionally, if the user logs in to an account in step 206, step 206 may be skipped before a subsequent control of the pre-arranged multimedia file, that is, steps 201 to 205 and step 207 are circularly executed.

To sum up, in the method for playing a multimedia file according to this embodiment of the present invention, a connection is established to a mobile terminal by using an interface; in a process in which the mobile terminal plays a pre-arranged multimedia file, an operation triggered for a control apparatus is received, the pre-arranged multimedia file being a file played before a main multimedia file, and the main multimedia file being a multimedia file that is selected to be played with the mobile terminal; and an operation signal corresponding to the operation is sent to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

In addition, it is detected whether an account has a permission to trigger the mobile terminal to execute a control operation on the pre-arranged multimedia file; if it is detected that the account has the permission, the control operation is executed on the pre-arranged multimedia file. By setting a permission for the account, the mobile terminal still normally plays the pre-arranged multimedia file for the account not having the permission, thereby ensuring an advertising effect of the pre-arranged multimedia file.

Figure 3:
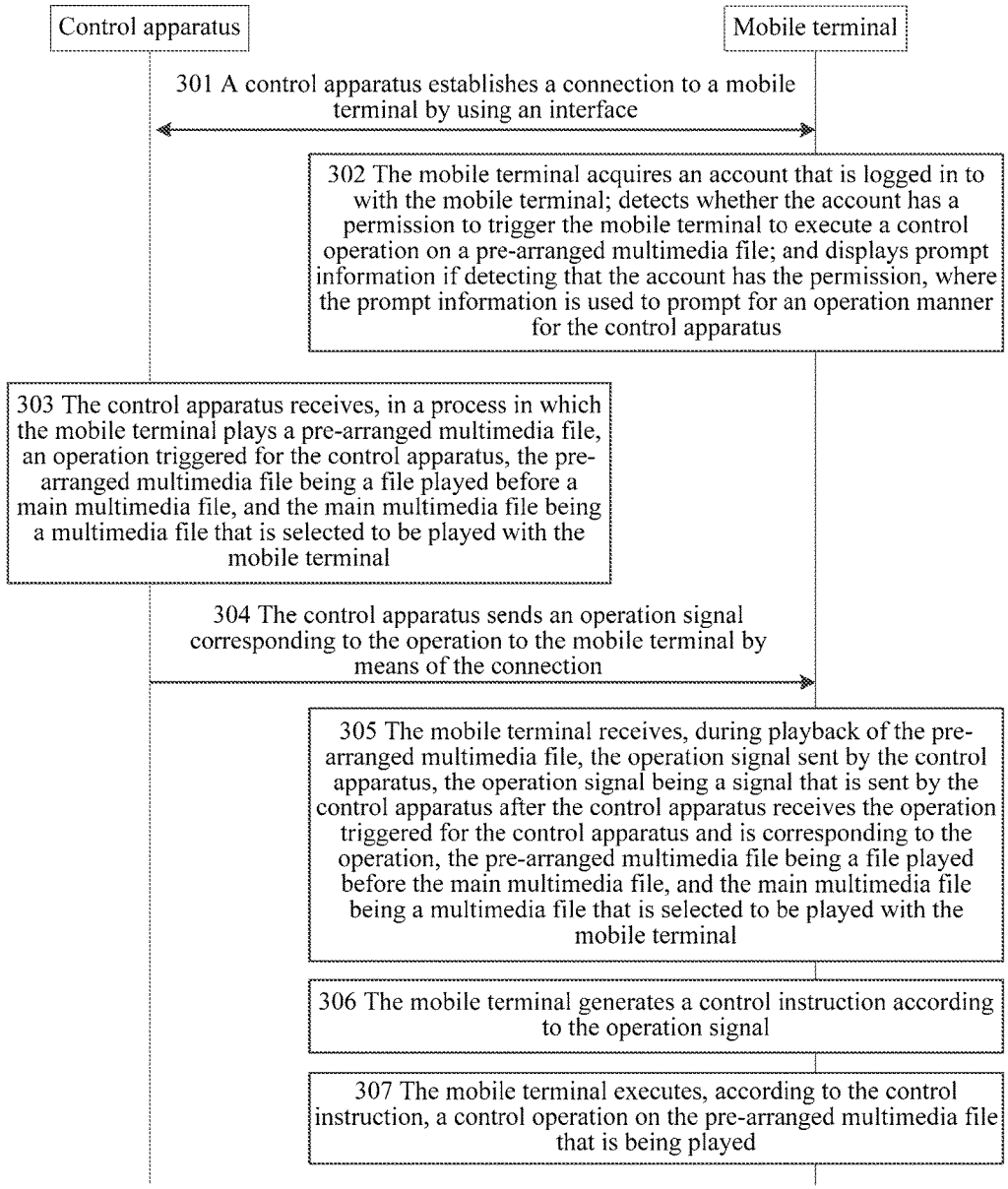
FIG. 3 is a method flowchart of a method for playing a multimedia file according to another embodiment of the present invention.

Referring to FIG. 3, FIG. 3 is a method flowchart of a method for playing a multimedia file according to another embodiment of the present invention. The method for playing a multimedia file can be applied to a playback system including a control apparatus and a mobile terminal, where the control apparatus is connected to the mobile terminal by using an interface provided by the mobile terminal, and the mobile terminal may be a smart TV, a smartphone, a tablet computer, or the like. This embodiment is described by using an example in which a user logs in to an account with the mobile terminal when a pre-arranged multimedia file is played. The method for playing a multimedia file includes:

Step 301. A control apparatus establishes a connection to a mobile terminal by using an interface.

The control apparatus is an apparatus for controlling a process in which the mobile terminal plays the multimedia file, and the control apparatus may be implemented as a control device. The multimedia file may be one of a video, an audio, and a picture. Refer to description in step 201 for a connection manner between the control apparatus and the mobile terminal, and the details are not described herein again.

The interface is an earphone interface, a USB interface, a micro USB interface, a mini USB interface, or a lighting interface.

Step 302. The mobile terminal acquires an account that is logged in to with the mobile terminal; detects whether the account has a permission to trigger the mobile terminal to execute a control operation for a pre-arranged multimedia file; and displays prompt information if detecting that the account has the permission, where the prompt information is used to prompt for an operation manner for the control apparatus.

The main multimedia file is a multimedia file that is selected by a user to be played with the mobile terminal, for example, a video that is selected by the user at a video website when the user browses the video website with the mobile terminal. The pre-arranged multimedia file is a multimedia file played before the main multimedia file, for example, an advertisement played before the video selected by the user. There may be at least one pre-arranged multimedia file, and the mobile terminal plays the main multimedia file after completing playback of the at least one pre-arranged multimedia file.

It should be noted that, for some popular main multimedia files, after the main multimedia file is played for a certain duration, the main multimedia file is paused and the pre-arranged multimedia file is inserted; and the main multimedia file is continued to be played after playback of the pre-arranged multimedia file is completed. In this case, the pre-arranged multimedia file is a multimedia file played during playback of the main multimedia file. This embodiment does not limit the time at which the pre-arranged multimedia file is played.

Because playing the pre-arranged multimedia file aims at advertising content of the pre-arranged multimedia file, in order to ensure an advertising effect of the pre-arranged multimedia file, a permission may be set for an account of a user who triggers the control instruction, where the permission is used to indicate whether the account can trigger the mobile terminal to execute the control operation on the pre-arranged multimedia file. Refer to description in step 206 for the method for setting a permission for the account.

Because the user has logged in to the account with the mobile terminal, the mobile terminal may directly read the account. After acquiring the account, the mobile terminal may detect whether the account belongs to a preset account list, determine that the account has the permission if the account belongs to the account list, or determine that the account does not have the permission if the account does not belong to the account list. The account list is used to record accounts having the permission.

If a certain account has the permission to trigger the mobile terminal to execute the control operation on the pre-arranged multimedia file, the mobile terminal may display prompt information in a playback interface, where the prompt information is used to prompt the user about an operation manner for the control apparatus. After being prompted by the prompt information, the user may clearly know how to trigger the control apparatus so that the mobile terminal generates the control instruction, thereby reducing the difficulty in triggering the control instruction, and increasing the number of times the control instruction is triggered, so as to achieve an effect of prolonging the service life of the mobile terminal.

Optionally, the mobile terminal may also set a font, a color, or a background color for the prompt information, so as to enhance a prompt effect.

Step 303. The control apparatus receives, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal.

The receiving an operation triggered on the control apparatus includes:

receiving a button pressing operation triggered on the control apparatus, or receiving a touch operation triggered on the control apparatus.

If a button is disposed on the top of the control apparatus, the user may press the button in the process in which the mobile terminal plays the pre-arranged multimedia file, to trigger the button pressing operation on the control apparatus; if a touch sensor is disposed on the top of the control apparatus, the user may touch the touch sensor in the process in which the mobile terminal plays the pre-arranged multimedia file, to trigger the touch operation on the control apparatus.

Step 304. The control apparatus sends an operation signal corresponding to the operation to the mobile terminal by means of the connection.

Specifically, the sending an operation signal corresponding to the operation to the mobile terminal by means of the connection includes:

1) generating a corresponding operation signal according to the number of times a button is pressed during the button pressing operation and a button pressing duration of the button pressing operation, where the operation signal is used to instruct the mobile terminal to generate a first playback instruction for playing a next pre-arranged multimedia file, or the operation signal is used to instruct the mobile terminal to generate a second playback instruction for playing the main multimedia file, or the operation signal is used to instruct the mobile terminal to generate a fast-forwarding instruction for fast-forwarding the pre-arranged multimedia file for a designated duration; and 2) sending the operation signal to the mobile terminal by means of the connection.

Refer to description in step 203 for a process in which the control apparatus sends the operation signal to the mobile terminal, and the details are not described herein again.

Step 305. The mobile terminal receives, during playback of the pre-arranged multimedia file, the operation signal sent by the control apparatus, the operation signal being a signal that is sent by the control apparatus after the control apparatus receives the operation triggered on the control apparatus and is corresponding to the operation, the pre-arranged multimedia file being a file played before the main multimedia file, and the main multimedia file being a multimedia file that is selected to be played with the mobile terminal.

The mobile terminal receives, by means of the connection established to the control apparatus, the operation signal sent by the control apparatus.

Step 306. The mobile terminal generates a control instruction according to the operation signal.

In this embodiment, different operation signals correspond to different control instructions; and therefore, the mobile terminal may identify an operation signal after receiving the operation signal, and generate a control instruction corresponding to the operation signal.

Step 307. The mobile terminal executes, according to the control instruction, a control operation on the pre-arranged multimedia file that is being played.

The mobile terminal controls playback of the pre-arranged multimedia file according to the generated control instruction. For example, the mobile terminal may pause the pre-arranged multimedia file, or may also fast-forward the pre-arranged multimedia file. The process in which the mobile terminal plays the pre-arranged multimedia file can be controlled by executing an operation on the control apparatus, without the need of operating the mobile terminal, thereby avoiding wearing down devices in the mobile terminal, and achieving an effect of prolonging the service life of the mobile terminal.

If the mobile terminal fast-forwards the pre-arranged multimedia file, a processing resource of the mobile terminal that is occupied during playback of the pre-arranged multimedia file is reduced, and a processing capability of the mobile terminal is improved; and moreover, a time spent by a user in waiting for playback of the main multimedia file is shortened, and user experience is improved.

Specifically, the executing, according to the control instruction, a control operation on the pre-arranged multimedia file that is being played includes:

1) if the control instruction is a first playback instruction for instructing the mobile terminal to play a next pre-arranged multimedia file, reading a to-be-played pre-arranged multimedia file and playing the pre-arranged multimedia file;

2) if the control instruction is a second playback instruction for instructing the mobile terminal to play a main multimedia file, reading the main multimedia file and playing the main multimedia file; and 3) if the control instruction is a fast-forwarding instruction for instructing the mobile terminal to fast-forward the pre-arranged multimedia file for a designated duration, acquiring a current playback duration for which the pre-arranged multimedia file is played, locating forward, based on the current playback duration, a playback time point at which the designated duration ends, and starting playing the pre-arranged multimedia file from the located playback time point.

First, when the control instruction is the first playback instruction, the mobile terminal may read a to-be-played pre-arranged multimedia file that is arranged just behind the pre-arranged multimedia file, and play the pre-arranged multimedia file. The mobile terminal may preset a pre-arranged multimedia file library, and read the pre-arranged multimedia file from the pre-arranged multimedia file library.

Secondly, when the control instruction is the second playback instruction, the mobile terminal may read the main multimedia file, and play the main multimedia file.

Thirdly, when the control instruction is the fast-forwarding instruction, the mobile terminal may acquire the current playback duration for which the pre-arranged multimedia file that is being played currently is played, locate a playback time point according to the current playback duration and the designated duration, and start playing the pre-arranged multimedia file from the located playback time point.

Optionally, before the locating forward, based on the current playback duration, a playback time point at which the designated duration ends, the method further includes:

1) calculating a residual playback duration of the pre-arranged multimedia file;

2) comparing the residual playback duration with the designated duration;

3) if it is obtained after the comparison that the residual playback duration is shorter than the designated duration, reading a to-be-played pre-arranged multimedia file, and playing the pre-arranged multimedia file; or if it is obtained after the comparison that the residual playback duration is shorter than the designated duration, reading the main multimedia file, and playing the main multimedia file; or 4) if it is obtained after the comparison that the residual playback duration is longer than or equal to the designated duration, triggering execution of the step of locating forward, based on the current playback duration, a playback time point at which the designated duration ends.

Before the playback time point is located according to the current playback duration and the designated duration, it is further required to compare whether the residual playback duration of the pre-arranged multimedia file is longer than or shorter than the designated duration. If it is obtained after the comparison that the residual playback duration is shorter than the designated duration, a fault occurs when the playback time point at which the designated duration ends is located forward based on the current playback duration; and the mobile terminal may directly read a next pre-arranged multimedia file or the main multimedia file, and play the pre-arranged multimedia file or main multimedia file. If it is obtained after the comparison that the residual playback duration is longer than or equal to the designated duration, the playback time point may be located, and the details are described above.

It should be noted that, the method for playing a multimedia file in this embodiment further includes:

1) receiving, in the process in which the mobile terminal plays the pre-arranged multimedia file, another operation triggered on the control apparatus; and 2) sending another operation signal corresponding to the other operation to the mobile terminal by means of the connection, so that the mobile terminal generates a display instruction according to the other operation signal, and displays information about a to-be-played pre-arranged multimedia file according to the display instruction.

The user may also trigger another operation on the control apparatus in the process in which the mobile terminal plays the pre-arranged multimedia file; and the control apparatus receives the other operation, and sends another operation signal corresponding to the other operation to the mobile terminal by means of the established connection. The another operation is an operation different from the control operation, for example, pressing the button three times by the user.

Correspondingly, the method for playing a multimedia file in this embodiment further includes:

1) receiving, during playback of the pre-arranged multimedia file, another operation signal sent by the control apparatus, where the other operation signal is a signal that is sent by the control apparatus after the control apparatus receives another operation triggered on the control apparatus and is corresponding to the other operation;

2) generating a display instruction according to the other operation signal; and 3) displaying information about a to-be-played pre-arranged multimedia file according to the display instruction.

The mobile terminal receives another operation signal sent by the control apparatus, generates the display instruction corresponding to the other operation signal, and displays the information about the to-be-played pre-arranged multimedia file.

Optionally, the mobile terminal may further set a permission to respond to the display instruction. For example, the terminal may detect whether the account has the permission to trigger the mobile terminal to respond to the display instruction, and if the mobile terminal detects that the account has the permission, the mobile terminal displays the information in the playback interface.

Optionally, the mobile terminal may also set a font, a color, or a background color for the information, so as to enhance a prompt effect.

It should be noted that, after the mobile terminal executes step 307, the control apparatus may further continue to receive a triggered operation. That is, steps 301 to 307 are executed circularly in a process in which the mobile terminal plays the pre-arranged multimedia file, till the mobile terminal completes playback of all pre-arranged multimedia files and ends the process. Optionally, if the user logs in to an account in step 302, step 302 may be skipped before a subsequent control of the pre-arranged multimedia file, that is, step 301 and steps 303 to 307 are circularly executed.

To sum up, in the method for playing a multimedia file according to this embodiment of the present invention, a connection is established to a mobile terminal by using an interface; in a process in which the mobile terminal plays a pre-arranged multimedia file, an operation triggered for a control apparatus is received, the pre-arranged multimedia file being a file played before a main multimedia file, and the main multimedia file being a multimedia file that is selected to be played with the mobile terminal; and an operation signal corresponding to the operation is sent to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

In addition, it is detected whether an account has a permission to trigger the mobile terminal to execute a control operation on the pre-arranged multimedia file; if it is detected that the account has the permission, prompt information is displayed, and a user is prompted to trigger the control instruction, thereby reducing the difficulty in triggering the control instruction, and increasing the number of times the control instruction is triggered, so as to improve an effect of prolonging the service life of the mobile terminal.

Figure 4:
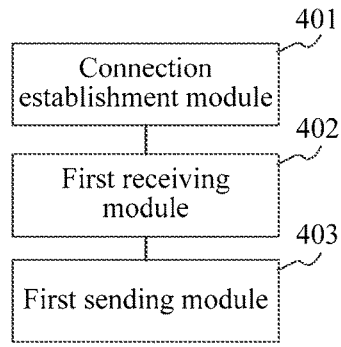
FIG. 4 is a structural block diagram of an apparatus for playing a multimedia file according to an embodiment of the present invention.

Referring to FIG. 4, FIG. 4 is a structural block diagram of an apparatus for playing a multimedia file according to an embodiment of the present invention. The apparatus for playing a multimedia file can be applied to a control apparatus, where the control apparatus is connected to a mobile terminal by using an interface provided by the mobile terminal, and the mobile terminal may be a smart TV, a smartphone, a tablet computer, or the like. The apparatus for playing a multimedia file includes a connection establishment module 401, a first receiving module 402, and a first sending module 403.

The connection establishment module 401 is configured to establish a connection to the mobile terminal using the interface.

The first receiving module 402 is configured to receive, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal.

The first sending module 403 is configured to send, to the mobile terminal by means of the connection, an operation signal corresponding to the operation received by the first receiving module 402, so that the mobile terminal generates a control instruction according to the operation signal, and executes, according to the control instruction, a control operation on the pre-arranged multimedia file that is being played.

To sum up, the apparatus for playing a multimedia file according to this embodiment of the present invention establishes a connection to a mobile terminal by using an interface; receives, in a process in which the mobile terminal plays a pre-arranged multimedia file, an operation triggered for a control apparatus, the pre-arranged multimedia file being a file played before a main multimedia file, and the main multimedia file being a multimedia file that is selected to be played with the mobile terminal; and sends an operation signal corresponding to the operation to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

Figure 5:
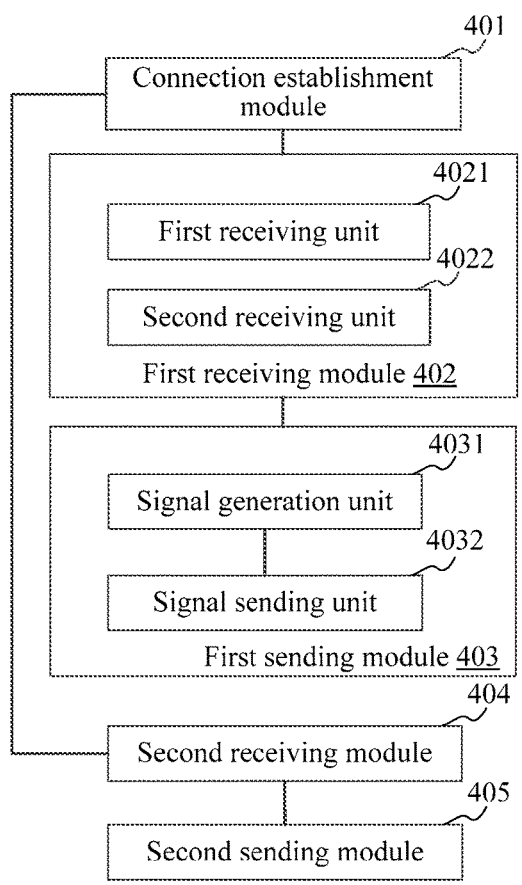
FIG. 5 is a structural block diagram of an apparatus for playing a multimedia file according to another embodiment of the present invention.

Referring to FIG. 5, FIG. 5 is a structural block diagram of an apparatus for playing a multimedia file according to another embodiment of the present invention. The apparatus for playing a multimedia file can be applied to a control apparatus, where the control apparatus is connected to a mobile terminal by using an interface provided by the mobile terminal, and the mobile terminal may be a smart TV, a smartphone, a tablet computer, or the like. The apparatus for playing a multimedia file includes a connection establishment module 401, a first receiving module 402, and a first sending module 403.

The connection establishment module 401 is configured to establish a connection to the mobile terminal using the interface.

The first receiving module 402 is configured to receive, in a process in which the mobile terminal plays a pre-arranged multimedia file, an operation triggered on the control apparatus, the pre-arranged multimedia file being a file played before a main multimedia file, and the main multimedia file being a multimedia file that is selected to be played with the mobile terminal.

The first sending module 403 is configured to send, to the mobile terminal by means of the connection, an operation signal corresponding to the operation received by the first receiving module 402, so that the mobile terminal generates a control instruction according to the operation signal, and executes, according to the control instruction, a control operation on the pre-arranged multimedia file that is being played.

Optionally, the first receiving module 402 includes:

a first receiving unit 4021, configured to receive a button pressing operation triggered on the control apparatus; or a second receiving unit 4022, configured to receive a touch operation triggered on the control apparatus.

Optionally, the first sending module 403 includes:

a signal generation unit 4031, configured to generate a corresponding operation signal according to the number of times a button is pressed during the button pressing operation and a button pressing duration of the button pressing operation, where the operation signal is used to instruct the mobile terminal to generate a first playback instruction for playing a next pre-arranged multimedia file, or the operation signal is used to instruct the mobile terminal to generate a second playback instruction for playing the main multimedia file, or the operation signal is used to instruct the mobile terminal to generate a fast-forwarding instruction for fast-forwarding the pre-arranged multimedia file for a designated duration; and a signal sending unit 4032, configured to send the operation signal generated by the signal generation unit to the mobile terminal by means of the connection.

Optionally, the apparatus for playing a multimedia file in this embodiment further includes:

a second receiving module 404, configured to receive, in the process in which the mobile terminal plays the pre-arranged multimedia file, another operation triggered on the control apparatus; and a second sending module 405, configured to send, to the mobile terminal by means of the connection, another operation signal corresponding to the other operation received by the second receiving module 404, so that the mobile terminal generates a display instruction according to the other operation signal, and displays information about a to-be-played pre-arranged multimedia file according to the display instruction.

Optionally, the interface is an earphone interface, a USB interface, a micro USB interface, a mini USB interface, or a lighting interface.

To sum up, the apparatus for playing a multimedia file according to this embodiment of the present invention establishes a connection to a mobile terminal by using an interface; receives, in a process in which the mobile terminal plays a pre-arranged multimedia file, an operation triggered for a control apparatus, the pre-arranged multimedia file being a file played before a main multimedia file, and the main multimedia file being a multimedia file that is selected to be played with the mobile terminal; and sends an operation signal corresponding to the operation to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

In addition, it is detected whether an account has a permission to trigger the mobile terminal to execute a control operation on the pre-arranged multimedia file; if it is detected that the account has the permission, the control operation is executed on the pre-arranged multimedia file. By setting a permission for the account, the mobile terminal still normally plays the pre-arranged multimedia file for the account not having the permission, thereby ensuring an advertising effect of the pre-arranged multimedia file.

Figure 6:
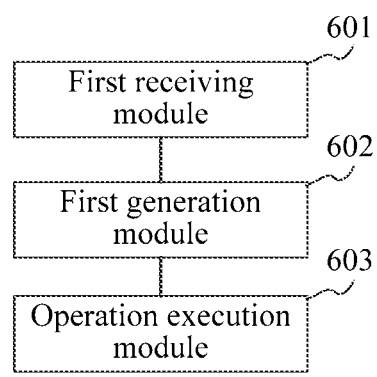
FIG. 6 is a structural block diagram of an apparatus for playing a multimedia file according to an embodiment of the present invention.

Referring to FIG. 6, FIG. 6 is a structural block diagram of an apparatus for playing a multimedia file according to an embodiment of the present invention. The apparatus for playing a multimedia file can be applied to a mobile terminal, where the mobile terminal provides an interface, a control apparatus is connected to the mobile terminal using the interface, and the mobile terminal may be a smart TV, a smartphone, a tablet computer, or the like. The apparatus for playing a multimedia file includes a first receiving module 601, a first generation module 602, and an operation execution module 603.

The first receiving module 601 is configured to receive, during playback of a pre-arranged multimedia file, an operation signal sent by the control apparatus, the operation signal being a signal that is sent by the control apparatus after the control apparatus receives an operation triggered on the control apparatus and is corresponding to the operation, the pre-arranged multimedia file being a file played before the main multimedia file, and the main multimedia file being a multimedia file that is selected to be played with the mobile terminal.

The first generation module 602 is configured to generate a control instruction according to the operation signal received by the first receiving module 601.

The operation execution module 603 is configured to execute, according to the control instruction generated by the first generation module 602, a control operation on the pre-arranged multimedia file that is being played.

To sum up, the apparatus for playing a multimedia file according to this embodiment of the present invention receives, during playback of a pre-arranged multimedia file, an operation signal sent by a control apparatus, the operation signal being a signal that is sent by the control apparatus after the control apparatus receives an operation triggered on the control apparatus and is corresponding to the operation, the pre-arranged multimedia file being a file played before the main multimedia file, and the main multimedia file being a multimedia file that is selected to be played with the mobile terminal; generates a control instruction according to the operation signal; and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

Figure 7:
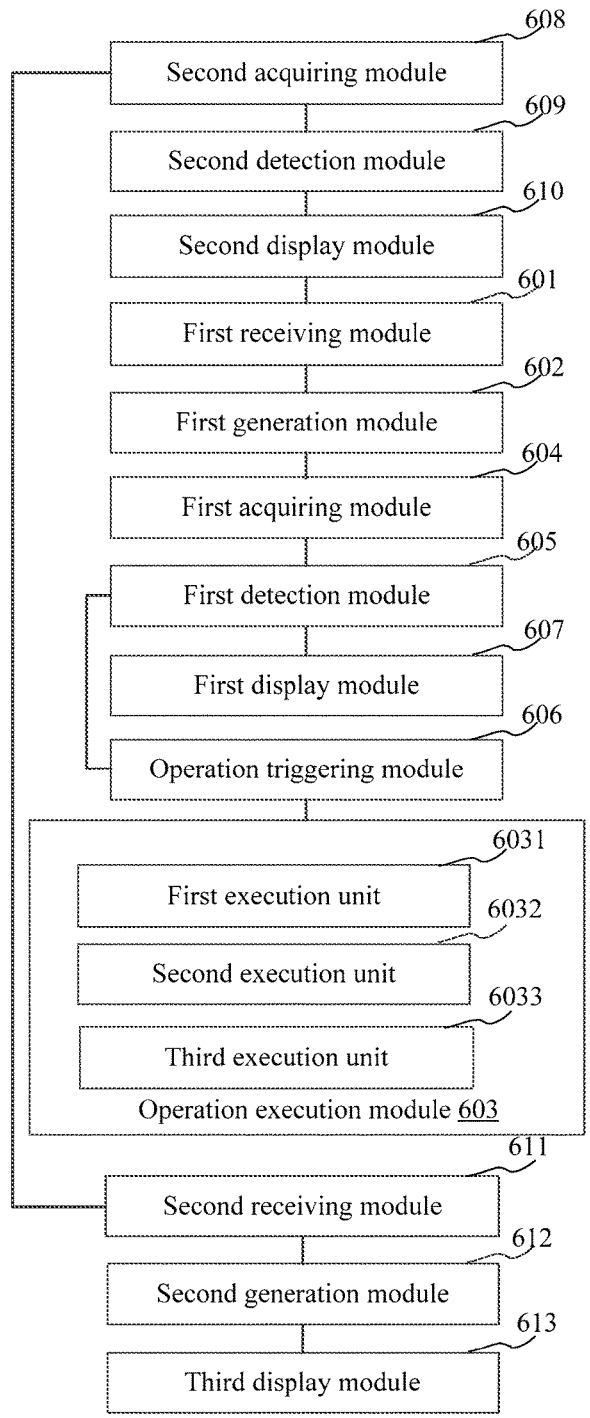
FIG. 7 is a structural block diagram of an apparatus for playing a multimedia file according to another embodiment of the present invention.

Referring to FIG. 7, FIG. 7 is a structural block diagram of an apparatus for playing a multimedia file according to another embodiment of the present invention. The apparatus for playing a multimedia file can be applied to a mobile terminal, where the mobile terminal provides an interface, a control apparatus is connected to the mobile terminal using the interface, and the mobile terminal may be a smart TV, a smartphone, a tablet computer, or the like. The apparatus for playing a multimedia file includes a first receiving module 601, a first generation module 602, and an operation execution module 603.

The first receiving module 601 is configured to receive, during playback of a pre-arranged multimedia file, an operation signal sent by the control apparatus, the operation signal being a signal that is sent by the control apparatus after the control apparatus receives an operation triggered on the control apparatus and is corresponding to the operation, the pre-arranged multimedia file being a file played before the main multimedia file, and the main multimedia file being a multimedia file that is selected to be played with the mobile terminal.

The first generation module 602 is configured to generate a control instruction according to the operation signal received by the first receiving module 601.

The operation execution module 603 is configured to execute, according to the control instruction generated by the first generation module 602, a control operation on the pre-arranged multimedia file that is being played.

Optionally, the operation execution module 603 includes:

a first execution unit 6031, configured to: if the control instruction is a first playback instruction for instructing the mobile terminal to play a next pre-arranged multimedia file, read a to-be-played pre-arranged multimedia file and play the pre-arranged multimedia file;

a second execution unit 6032, configured to: if the control instruction is a second playback instruction for instructing the mobile terminal to play a main multimedia file, read the main multimedia file and play the main multimedia file; and a third execution unit 6033, configured to: if the control instruction is a fast-forwarding instruction for instructing the mobile terminal to fast-forward the pre-arranged multimedia file for a designated duration, acquire a current playback duration for which the pre-arranged multimedia file is played, locate forward, based on the current playback duration, a playback time point at which the designated duration ends, and start playing the pre-arranged multimedia file from the located playback time point.

Optionally, the third execution unit 6033 is further configured to: calculate a residual playback duration of the pre-arranged multimedia file before locating forward, based on the current playback duration, a playback time point at which the designated duration ends; compare the residual playback duration with the designated duration; read a to-be-played pre-arranged multimedia file if it is obtained after the comparison that the residual playback duration is shorter than the designated duration, and play the pre-arranged multimedia file; or read the main multimedia file if it is obtained after the comparison that the residual playback duration is shorter than the designated duration, and play the main multimedia file; or trigger, if it is obtained after the comparison that the residual playback duration is longer than or equal to the designated duration, execution of the operation of locating forward, based on the current playback duration, a playback time point at which the designated duration ends.

Optionally, the apparatus for playing a multimedia file in this embodiment further includes:

a first acquiring module 604, configured to acquire, before the operation execution module 603 executes according to the control instruction a control operation on the pre-arranged multimedia file that is being played, an account that triggers an operation on the control apparatus;

a first detection module 605, configured to detect whether the account acquired by the first acquiring module 604 has a permission to trigger the mobile terminal to execute a control operation on the pre-arranged multimedia file; and an operation triggering module 606, configured to trigger, when the first detection module 605 detects that the account has the permission, execution of the operation of executing according to the control instruction a control operation on the pre-arranged multimedia file that is being played.

Optionally, the apparatus for playing a multimedia file in this embodiment further includes:

a first display module 607, configured to display prompt information after the first detection module 605 detects whether the account has the permission to trigger the mobile terminal to execute the control operation on the pre-arranged multimedia file and if the first detection module 605 detects that the account has the permission, where the prompt information is used to prompt for an operation manner for the control apparatus.

Optionally, the apparatus for playing a multimedia file in this embodiment further includes:

a second acquiring module 608, configured to acquire, before the first receiving module 601 receives the operation signal sent by the control apparatus, an account that is logged in to with the mobile terminal;

a second detection module 609, configured to detect whether the account acquired by the second acquiring module 608 has a permission to trigger the mobile terminal to execute a control operation on the pre-arranged multimedia file; and a second display module 610, configured to display prompt information when the second detection module 609 detects that the account has the permission, where the prompt information is used to prompt for an operation manner for the control apparatus.

Optionally, the apparatus for playing a multimedia file in this embodiment further includes:

a second receiving module 611, configured to receive, during playback of the pre-arranged multimedia file, another operation signal sent by the control apparatus, where the other operation signal is a signal that is sent by the control apparatus after the control apparatus receives another operation triggered on the control apparatus and is corresponding to the other operation;

a second generation module 612, configured to generate a control instruction according to the operation signal received by the second receiving module 611; and a third display module 613, configured to display information about a to-be-played pre-arranged multimedia file according to the display instruction generated by the second generation module 612.

To sum up, the apparatus for playing a multimedia file according to this embodiment of the present invention receives, during playback of a pre-arranged multimedia file, an operation signal sent by a control apparatus, the operation signal being a signal that is sent by the control apparatus after the control apparatus receives an operation triggered on the control apparatus and is corresponding to the operation, the pre-arranged multimedia file being a file played before the main multimedia file, and the main multimedia file being a multimedia file that is selected to be played with the mobile terminal; generates a control instruction according to the operation signal; and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

In addition, it is detected whether an account has a permission to trigger the mobile terminal to execute a control operation on the pre-arranged multimedia file; if it is detected that the account has the permission, prompt information is displayed, and a user is prompted to trigger the control instruction, thereby reducing the difficulty in triggering the control instruction, and increasing the number of times the control instruction is triggered, so as to improve an effect of prolonging the service life of the mobile terminal.

Figure 8:
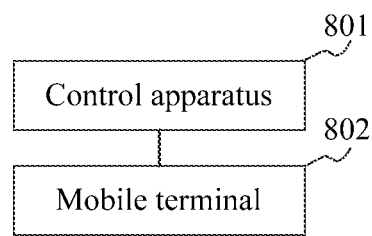
FIG. 8 is a structural block diagram of a system for playing a multimedia file according to an embodiment of the present invention.

Referring to FIG. 8, FIG. 8 is a structural block diagram of a system for playing a multimedia file according to an embodiment of the present invention. The system for playing a multimedia file may include a control apparatus 801 and a mobile terminal 802, and the mobile terminal 802 may be a smart TV, a smartphone, a tablet computer, or the like.

The control apparatus 801 may include the apparatus for playing a multimedia file that is shown in FIG. 4 or FIG. 5, and the mobile terminal 802 may include the apparatus for playing a multimedia file that is shown in FIG. 6 or FIG. 7.

To sum up, in the system for playing a multimedia file according to this embodiment of the present invention, a connection is established to a mobile terminal by using an interface; in a process in which the mobile terminal plays a pre-arranged multimedia file, an operation triggered for a control apparatus is received, the pre-arranged multimedia file being a file played before a main multimedia file, and the main multimedia file being a multimedia file that is selected to be played with the mobile terminal; and an operation signal corresponding to the operation is sent to the mobile terminal by means of the connection, so that the mobile terminal generates a control instruction according to the operation signal, and executes, according to the control instruction, a control operation on the pre-arranged multimedia file that is being played. In this way, playback of the pre-arranged multimedia file can be controlled by operating the control apparatus, thereby solving problems that devices are worn down and the service life of the mobile terminal is reduced when the playback of the pre-arranged multimedia file is controlled by operating the mobile terminal, and achieving an effect of prolonging the service life of the mobile terminal.

In addition, it is detected whether an account has a permission to trigger the mobile terminal to execute a control operation on the pre-arranged multimedia file; if it is detected that the account has the permission, the control operation is executed on the pre-arranged multimedia file. By setting a permission for the account, the mobile terminal still normally plays the pre-arranged multimedia file for the account not having the permission, thereby ensuring an advertising effect of the pre-arranged multimedia file.

It should be noted that, the above functional modules are only described for exemplary purposes when the apparatus for playing a multimedia file provided in the foregoing embodiments plays the multimedia file. In actual applications, the functions may be allocated to different functional modules according to specific needs, which means that the internal structure of the mobile terminal is divided to different functional modules to complete all or some of the above described functions. In addition, the apparatus for playing a multimedia file provided by the foregoing embodiment is based on the same concept as the method for playing a multimedia file in the foregoing embodiment. For the specific implementation process, refer to the method embodiments, and the details are not described herein again.

The sequence numbers of the foregoing embodiments of the present invention are merely for the convenience of description, and do not imply the preference among the embodiment.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for controlling playback of a multimedia file on a mobile terminal using a control apparatus, comprising:
   at the mobile terminal, where the mobile terminal is coupled to the control apparatus using an interface provided by the mobile terminal:
   receiving a user instruction to play a main multimedia file on the mobile terminal;
   playing a pre-arranged multimedia file associated with the main multimedia file on the mobile terminal before playing all or a portion of the main multimedia file;
   while playing the pre-arranged multimedia file on the mobile terminal, receiving an operation signal from the control apparatus through the interface provided by the mobile terminal, wherein the control signal is sent to the mobile terminal in response to a user operation received at the control apparatus, and wherein the control signal corresponds to a control instruction regarding playback of the pre-arranged multimedia file;
   in response to receiving the control signal received from the control apparatus through the interface provided by the mobile terminal:
      in accordance with a determination that a user account associated with the mobile terminal meets authorization criteria with respect to the control instruction, executing, according to the control instruction, a control operation on the pre-arranged multimedia file that is being played, wherein the authorization criteria require that the user account is a predefined social network account that has a permission to trigger the mobile terminal to execute the control operation on the pre-arranged multimedia file; and
      in accordance with a determination that the user account associated with the mobile terminal does not meet the authorization criteria with respect to the control instruction, forgoing executing the control operation on the pre-arranged multimedia file that is being played.

2. The method according to claim 1, wherein the user operation received at the control apparatus is a button pressing operation triggered on the control apparatus.

3. The method according to claim 2, wherein the operation signal is selected by control apparatus in accordance with a number of times a button is pressed during the button pressing operation and a button pressing duration of the button pressing operation.

4. The method of claim 3, wherein the operation signal is used to instruct the mobile terminal to generate a first playback instruction for playing a next pre-arranged multimedia file, or instruct the mobile terminal to generate a second playback instruction for the play of the main multimedia file, or instruct the mobile terminal to generate a fast-forwarding instruction for fast-forwarding the pre-arranged multimedia file for a designated duration.

5. The method according to claim 1, further comprising:
while playing the pre-arranged multimedia file on the mobile terminal:
receiving a second operation signal from the control apparatus through the interface provided by the mobile terminal, wherein the second operation signal corresponds to a display instruction at the mobile terminal; and
in response to receiving the second operation signal, displaying information about a to-be-played pre-arranged multimedia file according to the display instruction.

6. The method according to claim 1, wherein the interface is one selected from the group consisting of an earphone interface, a Universal Serial Bus (USB) interface, a micro USB interface, a mini USB interface, and a lighting interface.

7. A mobile terminal, comprising:
one or more processors;
an interface for coupling to a control apparatus, wherein the mobile terminal is communicably coupled to a control apparatus through the interface;
memory comprising a plurality of program instructions for:
receiving a user instruction to play a main multimedia file on the mobile terminal;
playing a pre-arranged multimedia file associated with the main multimedia file on the mobile terminal before playing all or a portion of the main multimedia file;
while playing the pre-arranged multimedia file on the mobile terminal, receiving an operation signal from the control apparatus through the interface provided by the mobile terminal, wherein the control signal is sent to the mobile terminal in response to a user operation received at the control apparatus, and wherein the control signal corresponds to a control instruction regarding playback of the pre-arranged multimedia file;
in response to receiving the control signal received from the control apparatus through the interface provided by the mobile terminal:
in accordance with a determination that a user account associated with the mobile terminal meets authorization criteria with respect to the control instruction, executing, according to the control instruction, a control operation on the pre-arranged multimedia file that is being played, wherein the authorization criteria require that the user account is a predefined social network account that has a permission to trigger the mobile terminal to execute the control operation on the pre-arranged multimedia file; and in accordance with a determination that the user account associated with the mobile terminal does not meet the authorization criteria with respect to the control instruction, forgoing executing the control operation on the pre-arranged multimedia file that is being played.

8. The mobile terminal according to claim 7, wherein the user operation received at the control apparatus is a button pressing operation triggered on the control apparatus.

9. The mobile terminal according to claim 8, wherein the operation signal is selected by control apparatus in accordance with a number of times a button is pressed during the button pressing operation and a button pressing duration of the button pressing operation.

10. The mobile terminal of claim 9, wherein the operation signal is used to instruct the mobile terminal to generate a first playback instruction for playing a next pre-arranged multimedia file, or instruct the mobile terminal to generate a second playback instruction for the play of the main multimedia file, or instruct the mobile terminal to generate a fast-forwarding instruction for fast-forwarding the pre-arranged multimedia file for a designated duration.

11. The mobile terminal according to claim 7, wherein the memory further include instructions for:
while playing the pre-arranged multimedia file on the mobile terminal:
receiving a second operation signal from the control apparatus through the interface provided by the mobile terminal, wherein the second operation signal corresponds to a display instruction at the mobile terminal; and
in response to receiving the second operation signal, displaying information about a to-be-played pre-arranged multimedia file according to the display instruction.

12. The mobile terminal according to claim 7, wherein the interface is one selected from the group consisting of an earphone interface, a Universal Serial Bus (USB) interface, a micro USB interface, a mini USB interface, and a lighting interface.

13. A non-transitory computer-readable storage medium, that includes instructions, which when executed by one or more processors of a mobile terminal that includes an interface for communicably coupling to a control apparatus, cause the mobile terminal to perform operations comprising:
receiving a user instruction to play a main multimedia file on the mobile terminal;
playing a pre-arranged multimedia file associated with the main multimedia file on the mobile terminal before playing all or a portion of the main multimedia file;
while playing the pre-arranged multimedia file on the mobile terminal, receiving an operation signal from the control apparatus through the interface provided by the mobile terminal, wherein the control signal is sent to the mobile terminal in response to a user operation received at the control apparatus, and wherein the control signal corresponds to a control instruction regarding playback of the pre-arranged multimedia file;
in response to receiving the control signal received from the control apparatus through the interface provided by the mobile terminal:
in accordance with a determination that a user account associated with the mobile terminal meets authorization criteria with respect to the control instruction, executing, according to the control instruction, a control operation on the pre-arranged multimedia file that is being played, wherein the authorization criteria require that the user account is a predefined social network account that has a permission to trigger the mobile terminal to execute the control operation on the pre-arranged multimedia file; and in accordance with a determination that the user account associated with the mobile terminal does not meet the authorization criteria with respect to the control instruction, forgoing executing the control operation on the pre-arranged multimedia file that is being played.

14. The computer-readable storage medium according to claim 13, wherein the user operation received at the control apparatus is a button pressing operation triggered on the control apparatus.

15. The computer-readable storage medium according to claim 14, wherein the operation signal is selected by control apparatus in accordance with a number of times a button is pressed during the button pressing operation and a button pressing duration of the button pressing operation.

16. The computer-readable storage medium according to claim 15, wherein the operation signal is used to instruct the mobile terminal to generate a first playback instruction for playing a next pre-arranged multimedia file, or instruct the mobile terminal to generate a second playback instruction for the play of the main multimedia file, or instruct the mobile terminal to generate a fast-forwarding instruction for fast-forwarding the pre-arranged multimedia file for a designated duration.

17. The computer-readable storage medium according to claim 13, wherein the memory further include instructions for:

while playing the pre-arranged multimedia file on the mobile terminal:
receiving a second operation signal from the control apparatus through the interface provided by the mobile terminal, wherein the second operation signal corresponds to a display instruction at the mobile terminal; and
in response to receiving the second operation signal, displaying information about a to-be-played pre-arranged multimedia file according to the display instruction.

18. The computer-readable storage medium according to claim 13, wherein the interface is one selected from the group consisting of an earphone interface, a Universal Serial Bus (USB) interface, a micro USB interface, a mini USB interface, and a lighting interface.

* * * * *